United States Patent [19]

Miller et al.

[11] Patent Number: 5,090,639
[45] Date of Patent: Feb. 25, 1992

[54] CARGO-CARRYING SYSTEM FOR PASSENGER AIRCRAFT

[75] Inventors: James T. Miller, Louisville; Michael T. McAlpin, Crestwood, both of Ky.; Gordon Sanden, Huntington Beach; Mark L. Snow, Woodland Hills, both of Calif.;

[73] Assignee: United Parcel Service General Services Co., Greenwich, Conn.

[21] Appl. No.: 700,111

[22] Filed: May 8, 1991

Related U.S. Application Data

[63] Continuation of Ser. No. 427,457, Oct. 26, 1989, abandoned.

[51] Int. Cl.$^5$ ............................................. B64C 1/20
[52] U.S. Cl. ........................... 244/118.1; 244/118.2; 244/137.1
[58] Field of Search ............... 244/118.1, 118.2, 137.1, 244/122 R, 137.2, 118.6; 220/1.5

[56] References Cited

U.S. PATENT DOCUMENTS

| | | | |
|---|---|---|---|
| 1,252,810 | 1/1918 | Kirchner | 220/1.5 |
| 1,349,209 | 8/1920 | Kirchner | 220/1.5 |
| 2,407,774 | 9/1947 | Fowler | 244/118.1 |
| 3,294,034 | 12/1966 | Bodenheimer et al. | 220/1.5 |
| 3,692,203 | 9/1972 | Byrd et al. | 220/1.5 |
| 3,828,964 | 8/1974 | Bonnot | 220/1.5 |
| 3,899,092 | 8/1975 | Nordstorm | 244/137.1 |
| 3,955,700 | 5/1976 | Pedraza | 244/118.1 |
| 3,968,895 | 7/1976 | Barnes, Jr. et al. | 220/1.5 |
| 4,008,936 | 2/1977 | Meller et al. | 220/1.5 |
| 4,046,277 | 9/1977 | Morrison | 105/366 |
| 4,147,111 | 4/1979 | Weingarten | 244/118.1 |
| 4,483,499 | 11/1984 | Fronk | 244/118.1 |
| 4,629,379 | 12/1986 | Harris et al. | 244/118.1 |
| 4,747,504 | 5/1988 | Wiseman et al. | 220/1.5 |
| 4,875,645 | 10/1989 | Courter | 244/118.1 |
| 4,929,133 | 5/1990 | Wiseman | 244/118.2 |

OTHER PUBLICATIONS

"Main Deck Container System," Boeing Commerical Airplane Company.
"Main Deck Caro on 727/757 Passenger Airplanes," Boeing Commerical Airplane Company.

Primary Examiner—Joseph F. Peters, Jr.
Assistant Examiner—Christopher P. Ellis
Attorney, Agent, or Firm—James A. Drobile; Robert A. Koons, Jr.; Robert E. Rosenthal

[57] ABSTRACT

System for carrying cargo in a passenger aircraft having containers, floor panels, seat tracks, and cargo locks. Containers are dimensioned to pass through a passenger door of an aircraft, fit under the overhead luggage racks of the aircraft and, when one container is positioned on each side of the passenger cabin of the aircraft, leave sufficient space between the containers to permit an aisle of the minimum size required by aviation safety regulations. The containers are sufficiently strong that, when loaded with cargo and fastened in place by the seat tracks and cargo locks, the containers will contain the cargo when subjected to accelerations which containers in passenger compartments must withstand under aviation safety regulations. The seat tracks and cargo locks are sufficiently strong that, when the containers are loaded with cargo and fastened by the cargo locks, the containers will stay in place when subjected to accelerations which containers in passenger compartments must withstand under aviation safety regulations. The container meets the fire extinguishing requirements of a Class D compartment under FAA regulations.

19 Claims, 7 Drawing Sheets

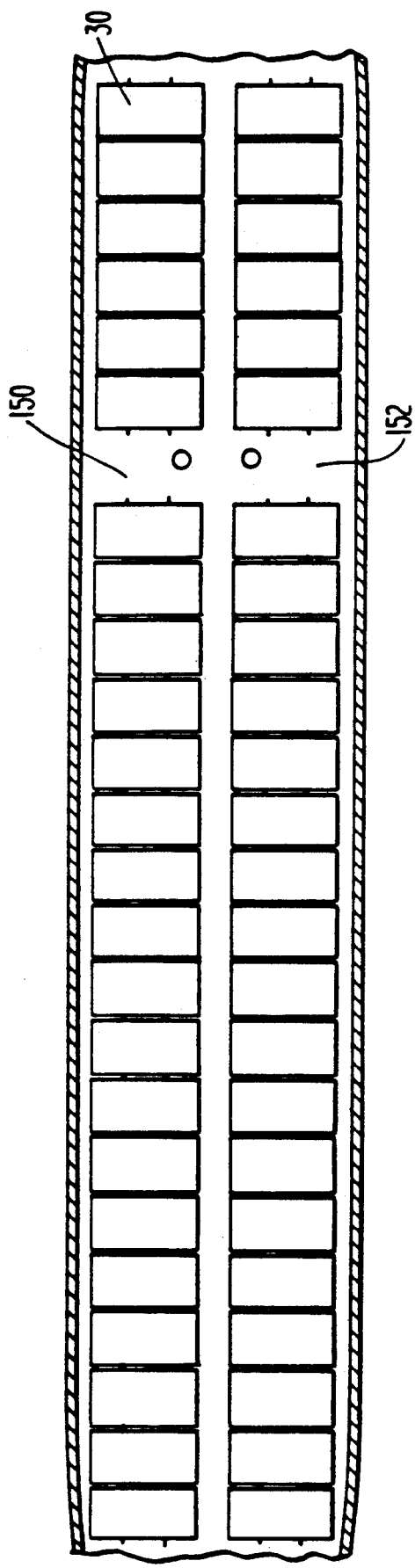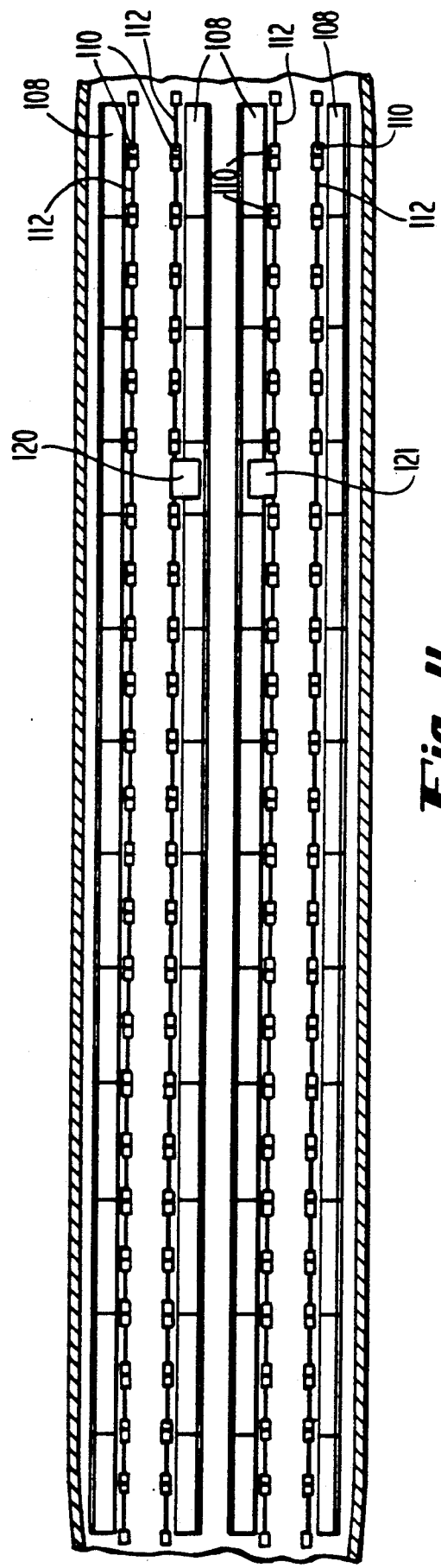
Fig. 10
Fig. 11

CARGO-CARRYING SYSTEM FOR PASSENGER AIRCRAFT

This is a continuation of copending application Ser. No. 07/427,457 filed on Oct. 26, 1989, now abandoned.

BACKGROUND OF THE INVENTION

This invention relates to systems for carrying cargo in aircraft. This invention relates in particular to systems for carrying cargo in passenger aircraft This invention also relates to methods for converting passenger aircraft to cargo use and then converting the aircraft back to passenger use.

In the usual practice, aircraft are built in passenger carrying versions and cargo-carrying versions Cargo aircraft and passenger aircraft are separately certified by the Federal Aviation Administration in the United States.

It is known in the prior art to convert passenger carrying aircraft to cargo-carrying aircraft. This process, as performed in the prior art, is both time-consuming and expensive. The process requires, initially, removal of all the interior appurtenances such as seats, restrooms, overhead luggage racks, and galleys of the passenger aircraft In order to meet Federal Aviation Administration ("FAA") requirements that there be structures to restrain cargo from moving into the crew cabin under an acceleration of 9g's, it is conventional to install a net or barrier between the cargo area and the crew cabin of an aircraft that has been converted from passenger to cargo use. This process requires removal of a portion of the interior skin of the aircraft and attachment of stringers to the interior structural members of the aircraft so as to provide anchor points for the net or barrier. Furthermore, it is conventional to remove the floor of the passenger aircraft, install reinforced support members and put in a stronger floor. Because of the permanent nature of these changes, it is rarely desirable to return the aircraft to passenger service once this process has been carried out.

It will be noted that, where an FAA requirement relating to acceleration is expressed as a specified number of times the acceleration of gravity the FAA in fact requires an additional factor of 15 percent All references to FAA requirements so expressed on this application should be so understood An example of a passenger aircraft that has been converted to cargo use is given in Wiseman. et al., U.S. Pat. No. 4,747,504, the disclosure of which is expressly incorporated by reference herein. Use of a passenger aircraft according to the teachings of Wiseman et al. would require numerous changes to the aircraft. The installation of a net or barrier forward of the cargo section of the aircraft which, as noted above, is expensive and time-consuming and makes conversion of the aircraft back to passenger use uneconomical, is required Furthermore, removal of all of the interior appurtenances of the aircraft including seats, seat tracks, galleys, lavatories, luggage racks, and window reveals, is necessary. Installation of a set of guide rails on the floor of the aircraft passenger cabin is necessary. Moreover, FAA certification requirements for passenger aircraft require an aisle down the center of an aircraft. The Wiseman, et al. cargo container is too large to permit such an aisle. Indeed, in the Wiseman, et al. central portion of the cabin of an aircraft is occupied by a central guide rail. Accordingly, an aircraft employing the Wiseman et al. system must be certified by the FAA as a cargo aircraft, further adding to the cost and delay of the conversion process.

Conventional cargo aircraft also have substantially different fire detection and extinguishing systems from passenger aircraft. Cargo aircraft have smoke detectors in the cargo area of the aircraft and separate air circulation and purification systems in the crew cabin and cargo area. When the smoke detectors in the cargo area detect smoke, the air circulation is shut down in the cargo area, extinguishing the fire. Fassenger aircraft, by contrast, have a single air circulation system. Thus, pursuant to FAA requirements, cargo must either be stored in containers which are so constructed that a fire in such a container will extinguish itself within a brief period, or the aircraft must have onboard fire-fighting equipment. As a result, if a passenger aircraft were used with the Wiseman et al. system, extensive modifications would have to be carried out to the air circulation systems of the aircraft.

Moreover, passenger aircraft have viewports in the floor of the passenger cabin for viewing the landing gear. These viewports are required by the FAA as a back-up system if primary systems do not indicate that the landing gear are in proper position for landing. In order to use the viewports, crew members must walk from the crew cabin to the passenger cabin. In modifying a passenger aircraft to use the system of Wiseman et al.. the aisle is blocked by containers, making the viewports inaccessible. As a result, installation of an alternative system for verifying whether the landing gear are in position is required.

The carrying of cargo, particularly parcels and small packages, is a seasonal business. In the United States, the quantity of packages shipped increases enormously every year in December, and then promptly decreases in January. Accordingly, it is highly desirable for shippers of parcels and packages to obtain additional aircraft during the month of December, but not economical to maintain such aircraft throughout the year. Furthermore, in the passenger aircraft business, there are often a significant number of aircraft that are not in use for passenger service during December, which corresponds to the peak period for delivery of parcels and packages by air. As a result, there is a need for a method of quickly converting such excess passenger aircraft to use as cargo aircraft during the peak period, and rapidly converting them back to passenger use after such peak period would be desirable.

OBJECTS OF THE INVENTION

It is accordingly an object of the invention to provide a method for converting passenger aircraft temporarily for use in a cargo aircraft.

It is a further object of this invention to provide a system for transporting cargo in the fuselage cabin of a passenger aircraft, which allows conversion of the aircraft from carrying passengers to carrying cargo more quickly and less expensively than prior art systems.

It is a further object of this invention to provide a system for transporting cargo in the fuselage cabin of a passenger aircraft that allows conversion of the aircraft from use for carrying cargo to use for carrying passengers more quickly and less expensively than prior art systems It is another object of this invention to provide a method of converting a passenger aircraft to a cargo-carrying aircraft While still allowing the aircraft to remain certified and operated under FAA regulations as a passenger aircraft It is a further object of this invention to provide a system for use of passenger aircraft to transport cargo that does not require installation of a net or barrier between the cargocarrying area of an aircraft and a crew cabin.

It is a further object of this invention to provide a method for converting a passenger aircraft to a cargo-carrying aircraft that does not require removal of all of the interior appurtenances of the passenger-carrying aircraft It is an object of this invention to provide a system for carrying cargo in a passenger aircraft that provides an aisle in the center of the aircraft that is of at least a minimum width prescribed by FAA regulations.

It is a further object of this invention to provide a system for carrying cargo in a passenger aircraft that distributes the weight of cargo and cargo containers on the floor of the aircraft so as to avoid exceeding design limits on the maximum load per square inch of floor space.

It is a further object of this invention to provide a system for carrying cargo in a passenger aircraft using containers that can be moved easily through the existing passenger doors on the aircraft, can be secured so as to stay in place in the aircraft when subjected to an acceleration in the forward direction of up to nine times the force of gravity without installation of a net or barrier in the aircraft, will fit below overhead luggage racks, and will, when paired with an identical or mirror-image container on the opposite side of the aircraft, provide an aisle of the minimum width required by aviation safety regulations It is a further object of this invention to provide a system for carrying cargo in a passenger aircraft using containers where any fire inside of the container will self-extinguish within fifteen minutes.

SUMMARY OF THE INVENTION

A system for carrying cargo in a passenger aircraft has containers, fastening means for fastening the contains in place, and weight distributing means for distributing the weight of the containers over the floor of the aircraft. The containers are dimensioned to pass through a passenger door of the aircraft, fit under the overhead luggage racks, and, when one container is positioned on each side of the passenger cabin of the aircraft, leave sufficient space between them to permit an aisle of the minimum size required by FAA safety regulations. The containers are sufficiently strong that, when loaded with cargo and fastened in place by the fastening means, they will contain the cargo when subjected to accelerations which containers in passenger compartments must withstand under FAA safety regulations. The fastening means and the containers are both sufficiently strong that, when the containers are loaded with cargo and fastened in place by said fastening means, the containers will remain in place when subjected to accelerations which containers in passenger compartments must withstand under FAA safety regulations.

A method of adapting to the carriage of cargo all or a selected portion of a cabin of a passenger aircraft having seats attached to one or more pairs of longitudinally extending seat tracks, galleys, and carpeting, includes the steps of removing, from all of the cabin or the selected portion thereof, seats, galleys, and carpeting, attaching cargo locks to the seat tracks, installing weight distributing means on the floor of the cabin, and installing containers so as to engage the cargo locks and rest on the weight distributing means. The containers are dimensioned to pass through a passenger door of the aircraft, fit under the overhead luggage racks, and, when one container is positioned on each side of the passenger cabin of the aircraft, leave sufficient space between them to permit an aisle of the minimum size required by FAA safety regulations. The containers are sufficiently strong, when loaded with cargo and engaging said cargo locks, to contain the cargo when subjected to accelerations which containers in passenger compartments must withstand under FAA safety regulations The seat tracks and the cargo locks are sufficiently strong to meet the FAA requirements for holding the containers in place when they are loaded with cargo and the aircraft is subjected to an acceleration of 9g's.

BRIEF DESCRIPTION OF THE DRAWINGS

FIG. 10 is a diagrammatic representation of a passenger cabin of an aircraft showing positions of containers according to the invention.

FIG. 11 is a diagrammatic representation of a passenger cabin of an aircraft showing a floor system according to the invention.

DETAILED DESCRIPTION OF THE INVENTION

Figure 1:
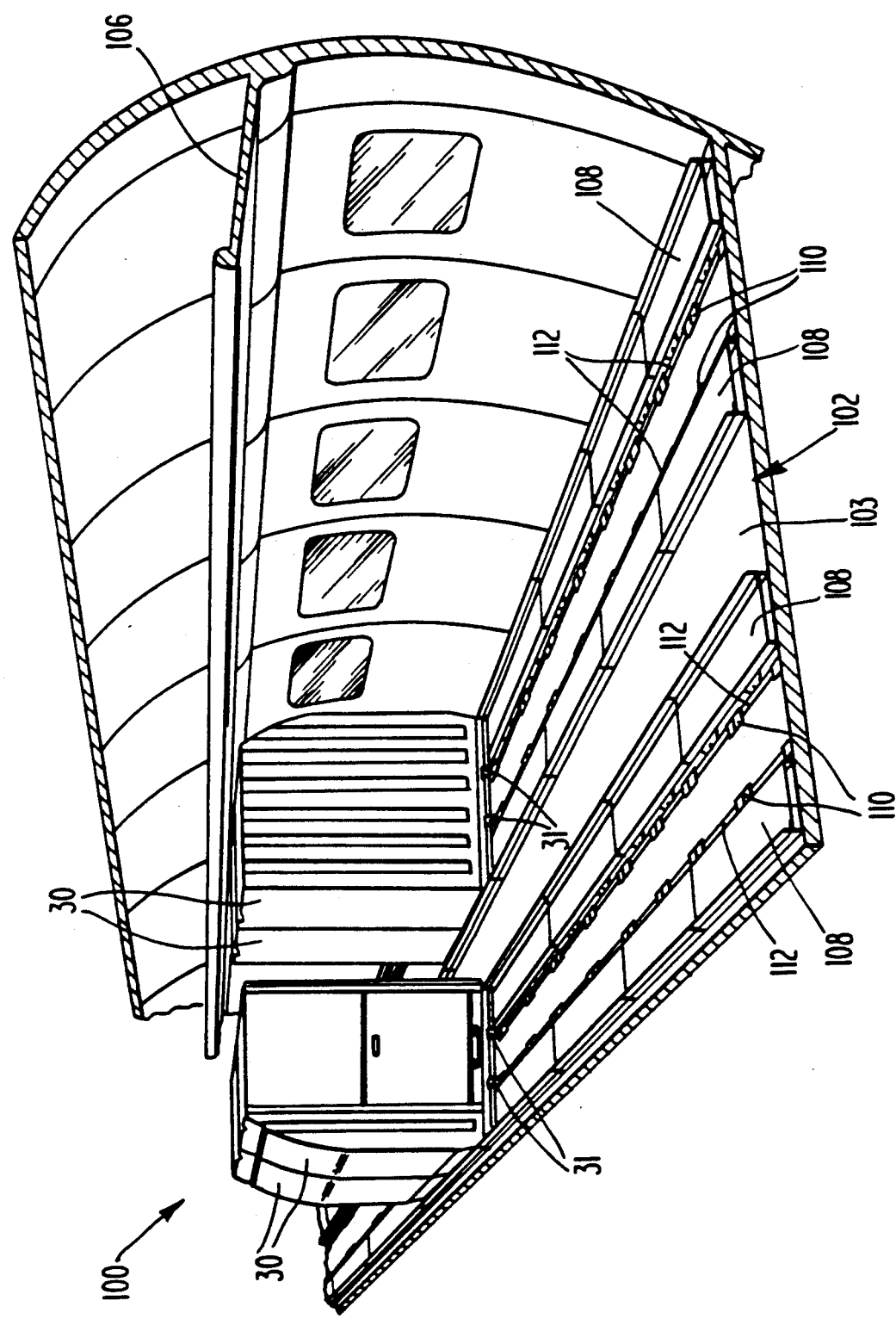
FIG. 1 is a fragmentary perspective view of an interior of a passenger cabin of an aircraft according to the invention.

With reference to FIG. 1, an interior of a passenger cabin of an aircraft is depicted in a fragmentary simplified perspective view. The cabin, generally designated 100, has a floor generally indicated at 102. Overhead luggage racks, generally designated at 106, are retained in the cabin. The overhead luggage racks are shown on one side only for ease of viewing the cabin. The floor 1Q2 of cabin 100 is divided into a left hand side and a right hand side, each of which is substantially identical. Between the two sides, there is an aisle 103.

On each side, there are two seat tracks, generally designated 112, which are substantially parallel to one another and run longitudinally much of the length of the cabin. These seat tracks are conventional seat tracks used in passenger aircraft. When the aircraft is in use as a passenger aircraft, latches attached to these tracks secure the seats. These tracks are left in place when the aircraft is converted from passenger use to cargo use, and when converted back to passenger use in accordance with the invention.

Also on each side of the floor of the aircraft passenger cabin there are indicated cargo locks 110. These cargo locks, which are of conventional design, are secured to the tracks 112. The cargo locks are arranged in pairs with each pair of cargo locks corresponding to one side of a row of seats when the aircraft is in use as a passenger aircraft. By way of example, each cargo lock may be thirty inches from the next cargo lock along the track. On each side, there are provided two rows of floor panels generally designated by 108. On each side, there is a row of floor panels between one seat track and the aisle in the center of the cabin, and a second row of panels between the other of the two seat tracks and the sidewall of the cabin.

Containers 30 are indicated on each side of the cabin. Cargo locks 31, which are identical to cargo locks 110, s®cure each container in place. Each container is also secured to the opposite side by two cargo locks, which are not shown in the Figure. The aisle is shown in the center of the aircraft cabin between the containers. Each container rests on floor panels. Thus the panels spread the weight of the containers over a larger area of the floor of the cabin than would otherwise be possible. The spreading of the weight of the containers over the cabin floor is essential because of maximum design limits on the weight per square inch of the cabin floor. Where, as in the prior art, a passenger aircraft is converted to a cargo aircraft, the floor of the aircraft for passenger use must be replaced by a stronger floor which would not require weight-spreading means. Use of floor panels 108 in the present invention avoids this modification by assuring that limits on the weight of the passenger aircraft floor will not be exceeded, even when the containers are fully loaded. Those of skill in the art will perceive that other structures for spreading the weight of the containers may be provided within the scope of the invention. The floor panels are also advantageous in that they provide a smooth surface on which to move the containers in the cabin.

Figure 12:
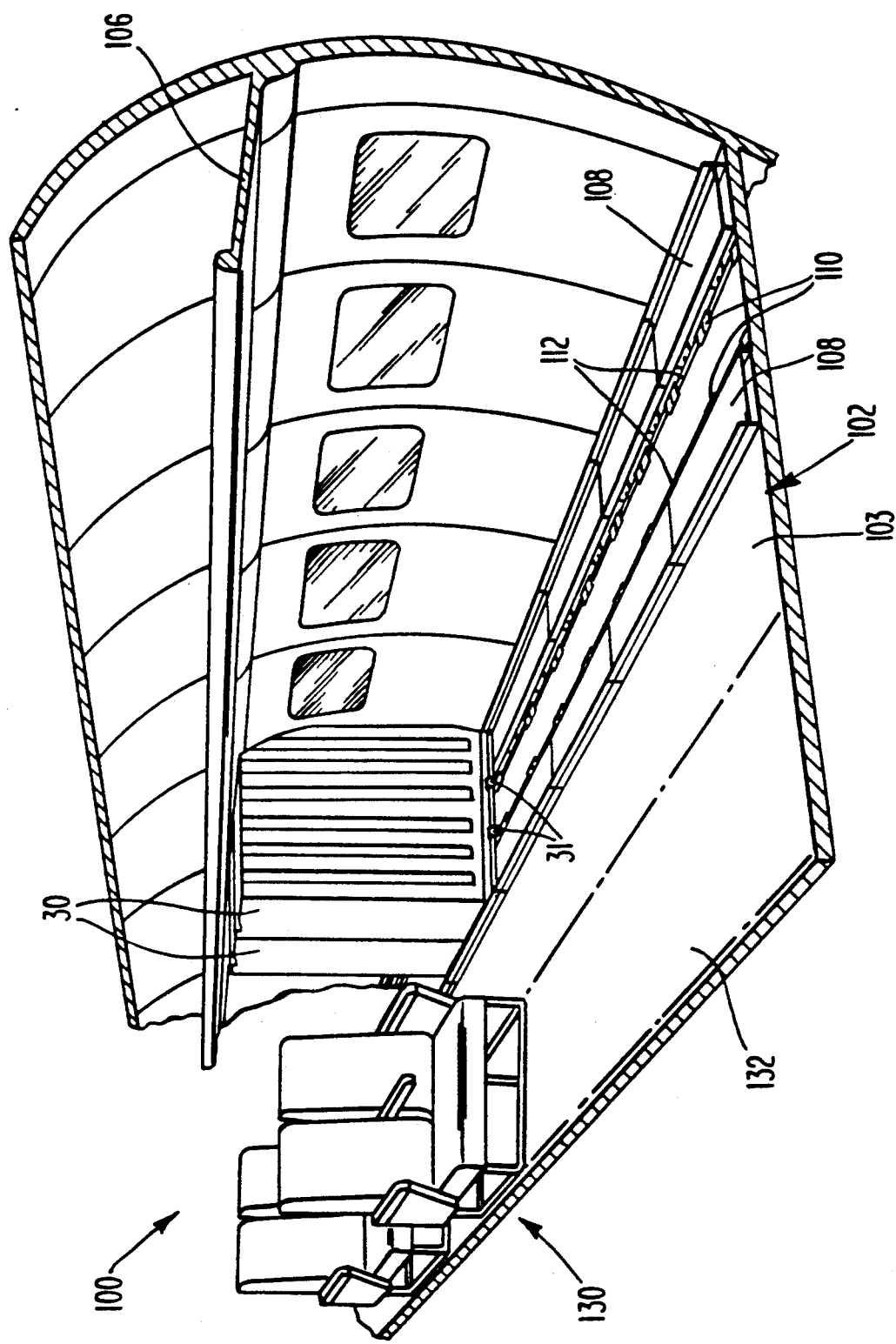
FIG. 12 is a fragmentary perspective view of an interior of a passenger cabin of an aircraft according to the invention.

With reference to FIG. 12, an interior of a passenger cabin of an aircraft is depicted in a fragmentary simplified perspective view. In FIG. 12, a selected portion of the passenger cabin has been adapted for use according to the system of the invention. The remainder of the passenger cabin of the aircraft depicts conventional passenger seats 130. For ease of understanding, only a representative few seats are depicted. The conventional passenger floor equipment 132, including carpets and seat track covers, is also shown in place.

Figure 2:
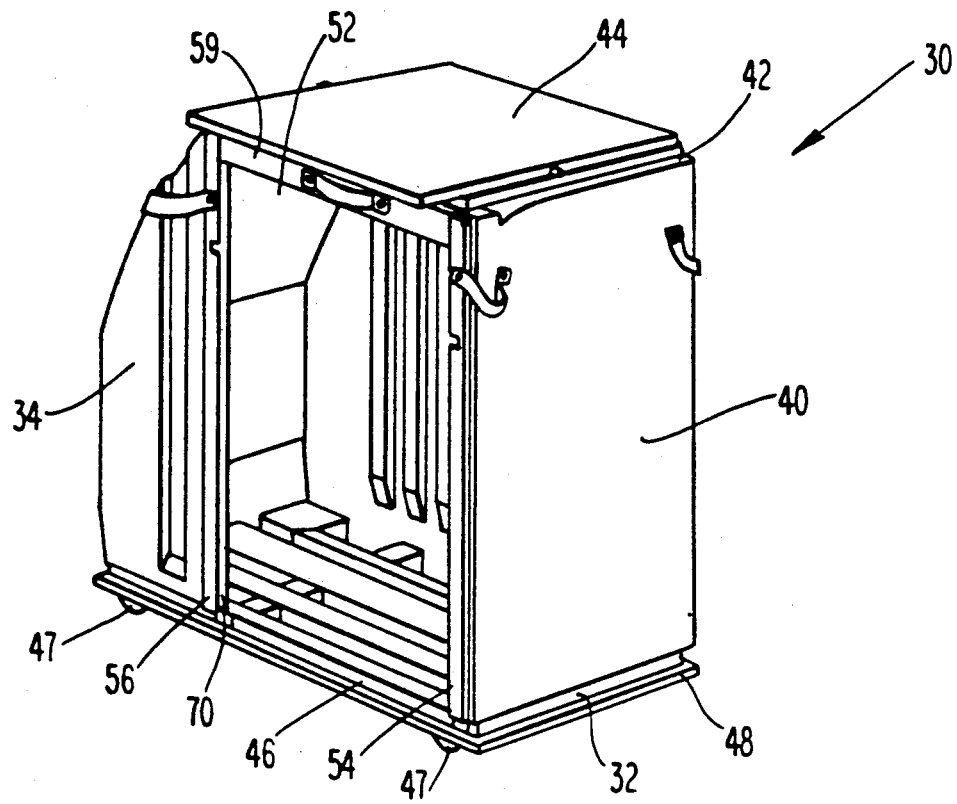
FIG. 2 is a perspective view of a container according to the invention.
Figure 3:
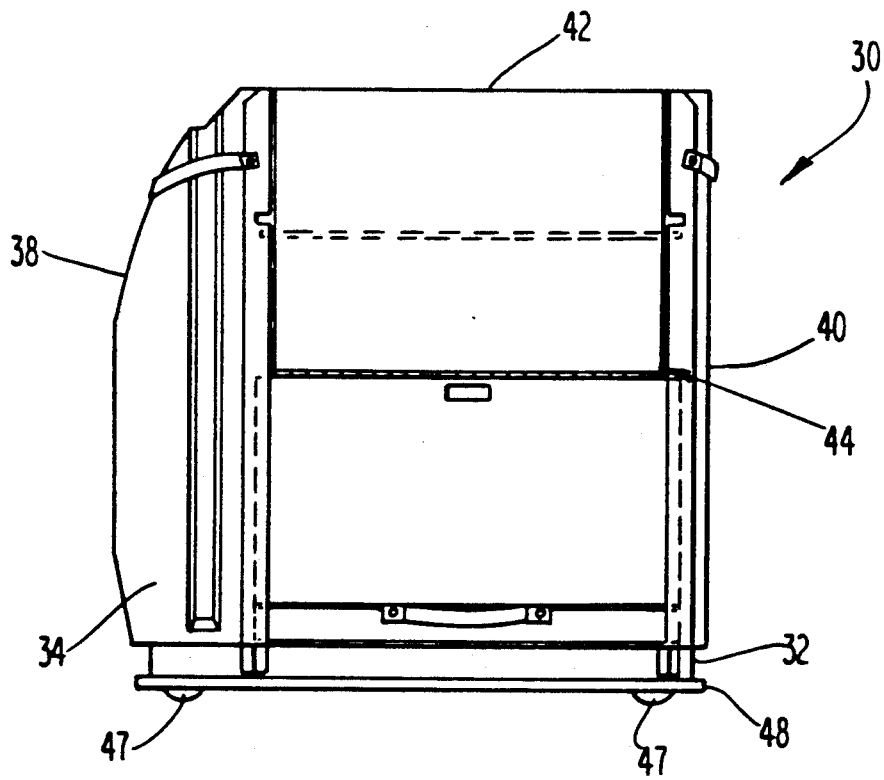
FIG. 3 is an elevational view of the door side of a container according to the invention

With reference to FIGS. 2 through 5, wherein like parts have been given like index numerals, there is depicted an embodiment of a container in accordance with the invention. The container is generally indicated at 30. The container includes a base generally indicated at 32, a door side generally indicated at 34, a non-door side generally indicated at 36, an outboard end generally indicated at 38, an inboard end generally indicated at 40, and a top generally indicated at 42. The container is provided with a door, generally indicated at 44 which is shown in FIG. 3 in a closed position in door side 34. Door 44 is shown in an open position resting on top 42 in FIG. 2.

Figure 6:
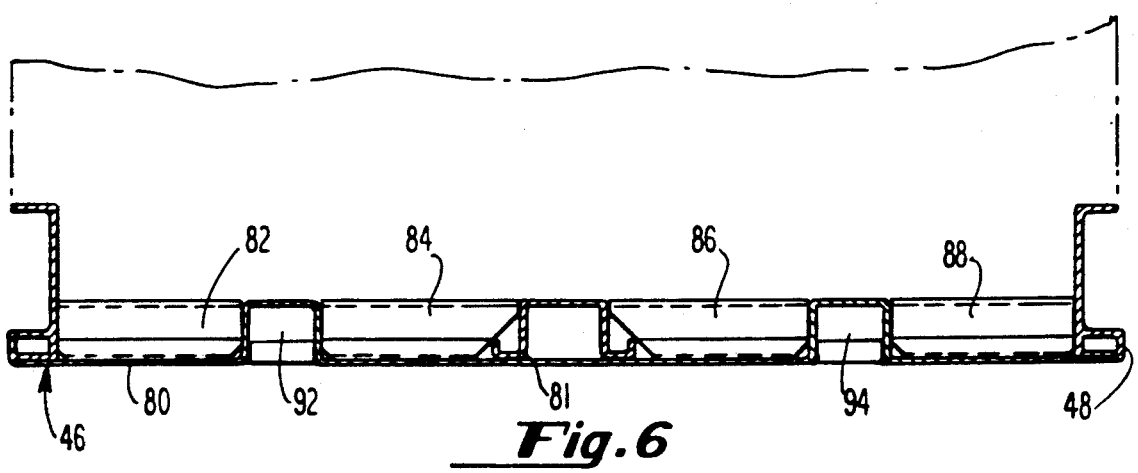
FIG. 6 is a sectional view of a base of a container according to the invention

Base 32 has a rectangular frame 46, which is made of a suitable strong material. In order to meet FAA regulations, frame 46 must be strong enough so that the container will hold the cargo and remain in place when subjected to a force of up to 9g's in the forward or aft direction while secured along the frame. Many designs for the frame are possible within the scope of the invention. Excellent results have been achieved with the construction shown in a cross-section view in FIG. 6. Frame member 80 is a substantially flat piece of a suitable material, such as aluminum, that has been bent at 90° angles along eight parallel lines. This bending results in two rectangular upward projections running across the surface, approximately one-quarter of the width of the frame from each edge. A substantially U-shaped crosspiece 81 is located parallel to these two projections across the center of frame member 80. Four sets of two stiffeners 82, 84, 86, and 88 are placed among the spaces created between the projections in frame member 80 and crosspiece 81. In a preferred embodiment, each stiffener is a flat piece of aluminum bent to describe three sides of a rectangle in cross-section. Blocks 92 and 94, which may also be of aluminum, are located within the two upward projections. This configuration of the floor has been found desirable in preventing compression of the floor in 9g acceleration testing of a container loaded with cargo to a maximum gross weight of 560 pounds including cargo and the container. However, other configurations may be used to prevent compression of the floor.

With reference to FIGS. 2 through 5, frame 46 is provided with an integral peripheral flange 45 which extends along sides 34 and 36 and ends 38 and 40. Frame 46 is also provided with four casters 47. These casters allow the containers to be rolled easily. However, within the scope of the invention, the containers could be moved without casters. For example, containers may be provided with runners of conventional design.

Figure 4:
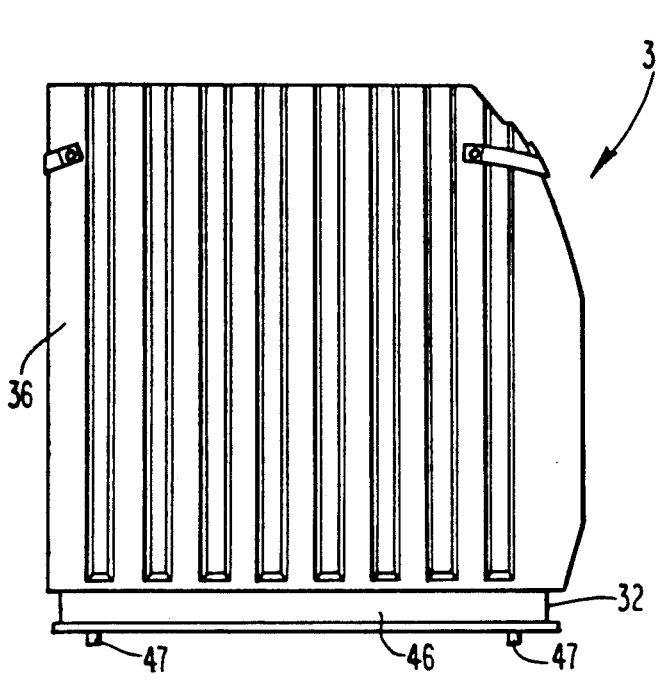
FIG. 4 is an elevational view of the non-door side of a container according to the invention.

Frame 46 supports the body of container 30, made up of sides 34 and 36, ends 38 and 40, and top 42. The body may be made of any appropriate lightweight and sufficiently strong material. The container must be strong enough so that, when fully loaded with cargo, secured along flange 48, and subjected to accelerations which containers for use in aircraft passenger compartments must withstand under FAA safety regulations, the container will contain the cargo and remain in place. Under current FAA safety regulations, such accelerations are 9g's in the forward direction, 1.5g in the aft direction, 3.0g's upward, 6.0g's downward, and 3.0g's to each side. By way of example, the body may be made of a plastic material. Excellent results have been achieved using a shell of rotationally molded cross-linked polyethylene for the top, ends, and sides of the container. As shown in FIGS. 2 and 4, the non-door side 36 may optionally have ribs so as to increase strength.

Figure 5:
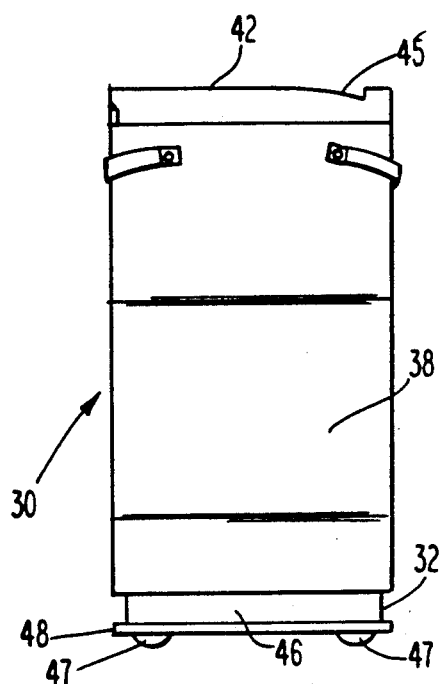
FIG. 5 is an elevational view of an end of a container according to the invention.
Figure 7:
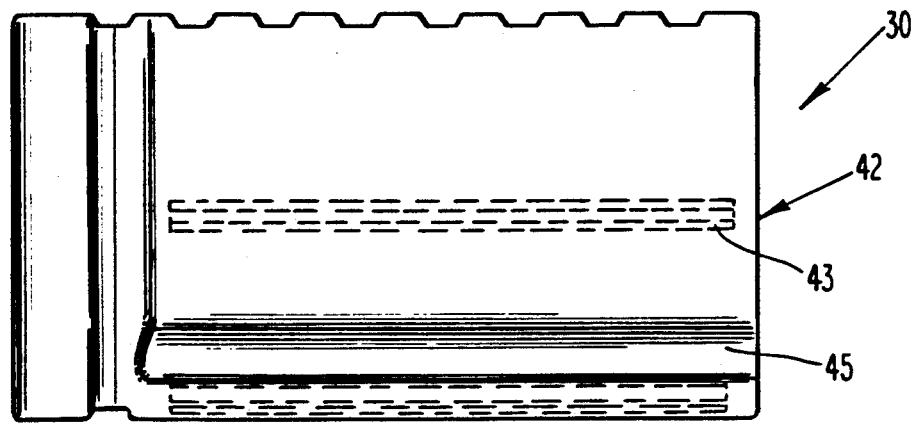
FIG. 7 is a top view of a container according to the invention.

As shown in FIG. 7, top 42 may have a roof stiffener 43 attached thereto on its inner surface extending between the inboard and outboard end. Such a roof stiffener may be a substantially rectangular piece of aluminum. With reference to FIGS. 5 and 7, top 42 may also be configured to slope downward to a gutter 45. Gutter 45 runs downward to the non-door side of the container. This configuration of the top permits rainwater to run off the container, as the container may be exposed to the elements during placement on the aircraft and removal from the aircraft. However, a system may be provided within the scope of the invention without either the roof stiffener or the gutter.

It will be noted from FIGS. 2, 3 and 4 that, in the embodiment shown, the sides 34 and 36 and inboard end 40 are substantially straight and vertical, while outboard end 3S is curved. Outboard end 38 is curved so as to correspond in curvature to the inside surface of the aircraft passenger cabin sidewall This configuration of the outboard end maximizes the volume available within each container for the carriage of cargo. However, within the scope of the invention, a container may be provided that has a differently configured outboard end.

With reference to FIGS. 2 and 3, door side 34 of container 30 is provided with a rectangular access or loading opening 52. The vertical edges of opening 52 are provided with door jambs 54 and 56. Door jambs 54 and 56 may be made of any suitable material; it has been found that aluminum is a desirable material for these door jambs Door jambs 54 and 56 are attached with rivets or otherwise rigidly and securely attached to door side 34 of the container. Door header 5g is attached rigidly, such as by rivets, at each end to the tops of door jambs 54 and 56, and is attached to the top of the container A track 70 is provided in jambs 54 and 56.

Figure 8:
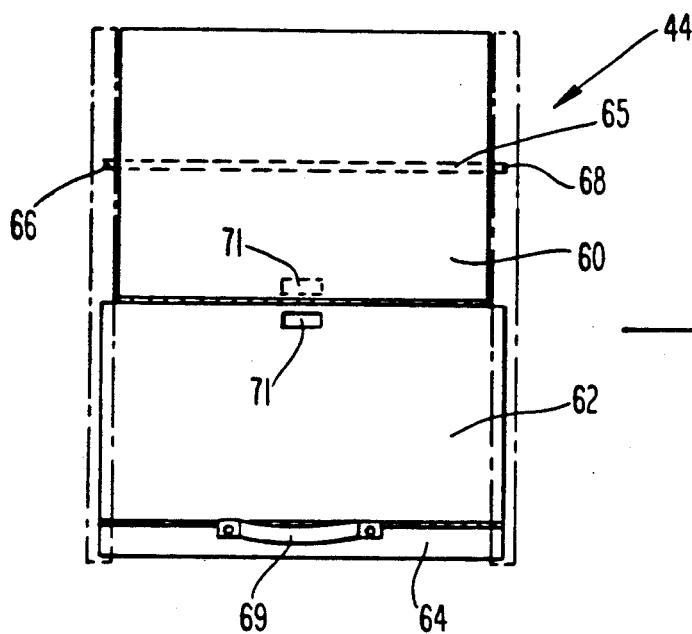
FIG. 8 is a plan view of a door of a container according to the invention.

Door 44 of container 30 is shown in FIG. 8. Door 44 is made up of an upper panel 60, an intermediate panel 62 and a lower panel 64. Lower panel 64 is hingedly affixed along its upper edge to the lower edge of intermediate panel 62. Intermediate panel 62 is hingedly affixed along its upper edge to the lower edge of upper panel 60. Bar 65, which has projections 66 and 68 on upper panel 60, rides in track 70 and keeps upper panel 60 in place. Projections 66 and 6B fit through notches in track 70, allowing upper panel 60 to be turned downward for access to the upper part of the interior of the container. Strap 69 is attached to bottom panel 64 and handles 71 are provided in top panel 60 and intermediate panel 62. Other than the position of bar 65 and the corresponding notches in track 70, the operation of the panels is disclosed in Wiseman et. al., U.S. Pat. No. 4,747,504, col. 4, line 24., to col. 6, line 16, which is expressly incorporated therein by reference.

The door panels may be made of aluminum or other light-weight, strong materials. By way of example only, each door panel may be interior aluminum honeycomb layer with two relatively thin exterior aluminum sheets affixed thereto by means of a film adhesive. It will be apparent to those of skill in the art, however, that the disclosed construction of door 44 is only one of many possible different door constructions that may be employed in accordance with the invention. Those of skill in the art will be able to design other door constructions for use within the scope of the invention.

Container 30, having the disclosed base structure, door structure, roof stiffener, and shell of cross-linked polyethylene, has been tested to contain 560 pounds total gross weight of cargo and container and remain restrained by conventional cargo locks under accelerations of up to 9g's in the forward and aft directions and 3.0g's upward, 6.0g's downward, and 3.0g's sideways. However, within the scope of the invention, a container may be provided having a higher total gross weight.

It will be seen that the dimensions of containers 30 are dictated by the limitations of the interior of the aircraft passenger cabin. The widths of ends 38 and 40 of the container can be no greater than the width of the passenger entry door of the aircraft, so as to permit loading and unloading of the containers. The height of the containers can be no greater than the height from the floor of the cabin to the lower side of the overhead luggage racks. The width of the container across the cabin is limited by the necessity of having an aisle, of the minimum width prescribed by FAA safety regulations, through the center of the cabin. Thus, under current regulations, the width of the container can be no greater than that width which will allow an aisle of at least 15 inches in the center of the cabin when a container is placed on each side of the cabin.

Figure 9:
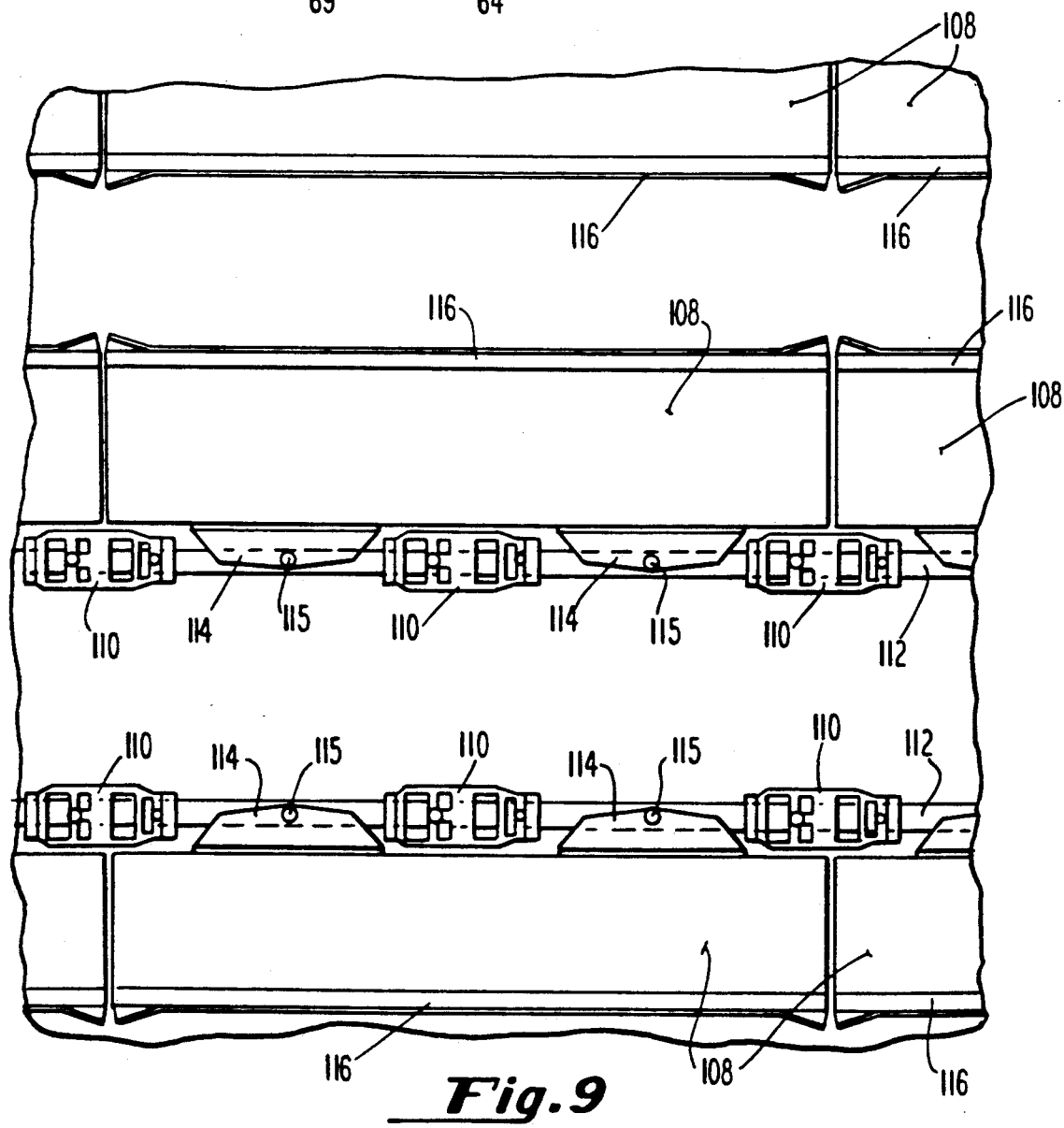
FIG. 9 is a partial plan view of a floor of passenger cabin of an aircraft according to the invention.

With reference to FIG. 9, a plan view of a section of the floor of a passenger cabin of an aircraft in accordance with the invention is shown. Seat tracks 112, floor panels 108, and cargo locks 110 are shown. Each seat track is a longitudinal length of metal with two upward projecting sides, which sides turn toward each other, forming a series of circular holes for placement of shear plungers. In conventional design, such circular holes are placed a tone-inch intervals. Each floor panel 108 has two attaching members, designated at 114, on the side of the floor panel that is adjacent to a track 112. Each attaching member has a hole 115, which is aligned with a hole in a track for the placement of a shear plunger to secure the panel to tracks 112. Each floor panel 108 has attached to the opposite side a guide rail designated as 116, the function of which is explained below.

The floor panels 108 may be made of any suitable material. By way of example, it has been found that a composite structure, made of a central layer of balsa wood and two outer layers of aluminum, has desirable characteristics. The attaching members 114, which are riveted or otherwise rigidly attached to panels, may be made of an aluminum alloy with a hard anodized surface, or other suitably strong material. The guide rail 116, which is also rigidly attached to the floor panel, may also be made of an aluminum alloy with a hard anodized surface or other suitably strong material As noted above, containers according to the invention may be provided with a flange along the outboard and inboard ends. These flanges are at the same level as the guide rails, so as to engage the guide rails if the container moves laterally. The guide rails 116 must be sufficiently strong to prevent a fully-loaded container from moving laterally under an acceleration of 3 g's, as required by FAA regulations. Each guide rail extends downward and away from the panel at each end of the panel; this facilitates rolling of the containers on the panels when placing containers in position or removing them from the aircraft. Within the scope of the invention, other structures may be provided for restraining the containers against lateral movement.

Cargo locks 110 are selected so as to restrain a fullyloaded container in place at an acceleration of at least nine times the force of gravity in a forward or aft direction. Such cargo locks are known and conventionally used. Each cargo lock has a lowered position, which allows containers to pass over the cargo lock. When a container is in place immediately to the rear of a cargo lock, the cargo lock is put in its operational position, engaging the flange of the container to the rear. At the rear of the most rearward containers, and at the front of the most forward containers, rigid cargo locks may be provided. It should be noted that in certain aircraft, such as the Boeing 727-100, the tracks curve slightly near the forward end of the passenger cabin. This curvature requires the use of slightly modified cargo locks in order to assure that the cargo locks engage the flanges of the containers in this part of the cabin. Such modified cargo locks are within the level of skill in the art. Tracks 112 are conventionally constructed and secured to the floor of the cabin so as to withstand a force of nine times the force of gravity up to a specified maximum weight for each section of each row of seats. It will be understood that the containers may be loaded to the lesser of the overall monocoque loading capability of the aircraft as expressed in pounds per running inch and pounds per square foot, or the maximum weight for each container, or the capabilities of local structure, including seat tracks, floors, floor beams, and frames.

The purpose of assuring that the cargo locks and the containers are strong enough to withstand 9g's of acceleration is to eliminate the need under FAA regulations for a barrier or net separating the cargo area of the aircraft from the crew cabin. Elimination of the barrier or net means that lengthy and costly modifications to the interior of the aircraft, involving removal of a portion of the interior skin and attachment of the barrier to the structural support members in the frame of the aircraft, can be avoided. Accordingly, rapid and inexpensive modification of the aircraft for use for transporting cargo in accordance with the invention, and conversion back to passenger use, is enabled.

As noted above with reference to FIG. 1, a space or aisle, is provided between the containers on the right hand side and the containers on the left hand side of the aircraft cabin. This space or aisle, which under current FAA regulations must be at least 15 inches in width, is required so that the aircraft may continue to be certified and operated as a passenger aircraft. The aisle allows crew members to walk to the landing gear viewports to see if the landing gear is locked, and to carry portable fire extinguishers to a fire anywhere in the passenger cabin.

Each container of the invention may be designed so that, when the container is loaded with the types of packages customarily used in shipping cargo, in the event a fire begins within the container, the fire extinguishes itself within 15 minutes. This feature allows the container to be considered a Class D compartment under FAA regulations. As a result, there is no need under those regulations for the aircraft to carry smoke detectors or fire extinguishing equipment that, in the prior art, are required in both the crew area and the cargo area of a cargo aircraft. Also, there is no need for—as in the prior art, in cargo aircraft—a separate air circulation system for the section of the aircraft where the cargo is carried. The self-extinguishing capability is achieved by employing a fire-resistant material for the sides, ends and top of the container, and by assuring that joinders between different parts of the container are sufficiently tight to minimize the flow of air into the container. The design and composition of the container described above has given results which meet or exceed FAA requirements.

FIG. 10 is a diagrammatic representation of a passenger aircraft provided with containers and floor assembly of the invention. Containers 30 are shown loaded in the aircraft It will be seen that two spaces 150 and 152 have been left open. The spaces 150 and 152 are over the viewports for the landing gear of the aircraft. In operation as a passenger aircraft, these viewports are accessible to the crew. In carrying cargo according to the invention, the provision of a central aisle in the passenger cabin and the absence of containers over the viewports allows a member of the crew to walk from the cockpit to the viewports. If such access were not provided, the aircraft would have to be modified to provide an alternate means to verify the position of the landing gear. Such modifications, which would be expensive and time-consuming, are avoided by the invention.

FIG. 11 is a diagrammatic representation of a passenger cabin of an aircraft according to the invention. The seat tracks 112, floor panels 108, and cargo locks 110 are shown. Floor panels 120 and 121, which are over the viewports, are specially designed to permit containers to pass over them but may be opened for access to the Viewports.

Figure 13:
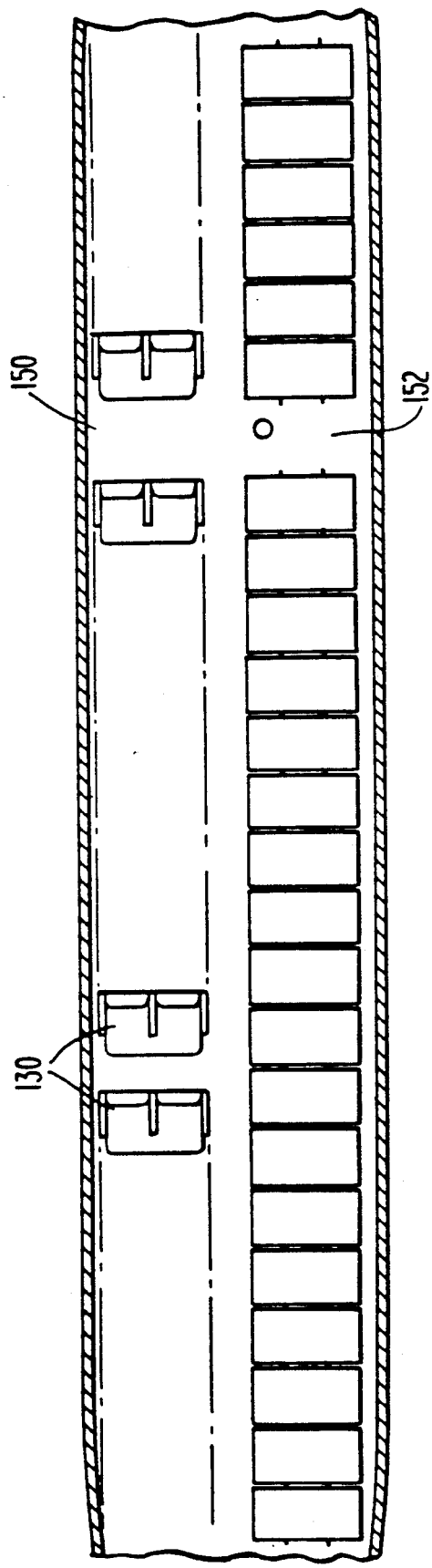
FIG. 13 is a diagrammatic representation of a passenger cabin of an aircraft, a portion of which cabin is adapted to the carriage of cargo, showing positions of containers according to the invention.

FIG. 13 is a diagrammatic representation of a passenger aircraft provided with containers and floor assembly according to the invention in a portion thereof. Conventional passenger seats 130 are shown in place in a portion of the cabin which has not been adapted to the carriage of cargo. For ease of understanding, only a representative few seats are depicted.

Figure 14:
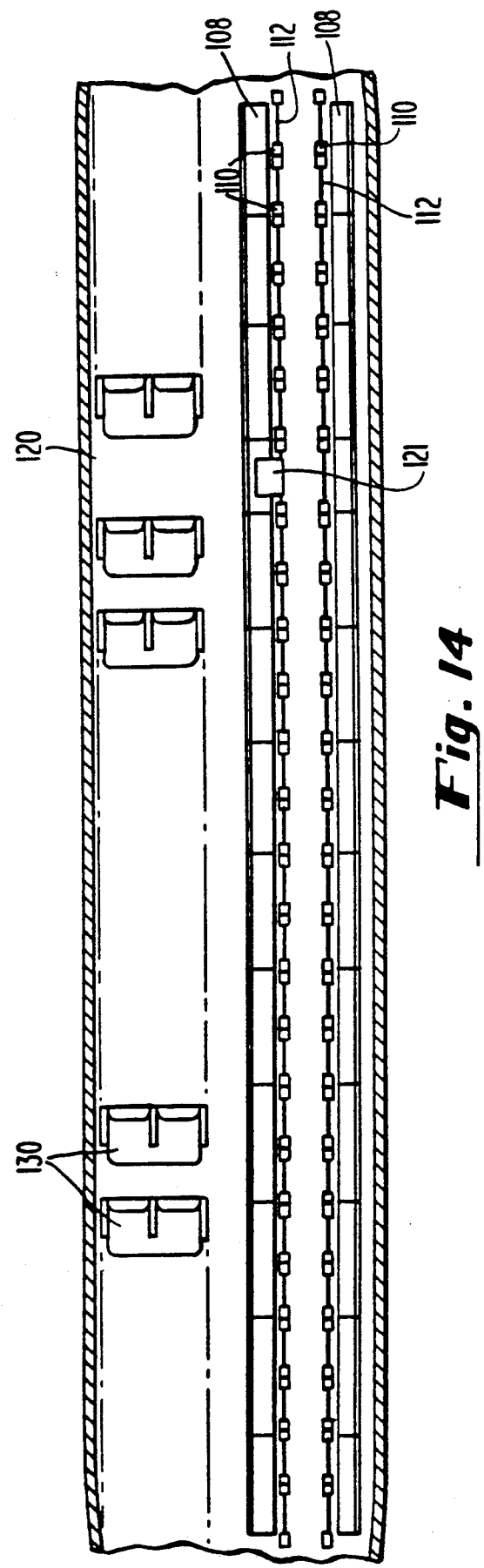
FIG. 14 is a diagrammatic representation of a passenger cabin of an aircraft, a portion of which cabin is adapted to the carriage of cargo, showing a floor system according to the invention.

FIG. 14 is a diagrammatic representation of a passenger cabin of an aircraft, a portion of which cabin has been adapted to the carriage of cargo according to the invention. Conventional passenger seats 130 are shown in place in a portion of the cabin which has not been adapted to the carriage of cargo according to the invention. For ease of understanding, only a representative few seats are depicted.

Of course, weight and balance calculations, as are required when an aircraft is operated, must be performed. The results of such calculations will indicate the procedures to be followed when loading the aircraft when using the system of the invention Each cargo container may be designated for placement in a given row and on a given side of the aircraft, and this information may be indicated on the container. In addition, the maximum loading for the container must be indicated on the container in order to comply with FAA requirement. This loading information affords rapid loading of containers on the ground without making detailed measurements of the distribution of the load in the aircraft.

By way of example, the tracks in a Boeing Corporation model 727-100 aircraft are stressed for loads from 760 pounds up to 845 pounds total gross weight per 30 inches. Each 30 inches approximately represents one row of seats when the aircraft is used for passengers. In using such an aircraft with the present invention, the width of the container will not exceed 30 inches and the maximum loading of the container will not exceed the lesser of the maximum loading for the container or the maximum for the space where the container is placed. The containers would, as noted above, be marked so as to indicate the maximum weight.

The method of conversion of the aircraft from passenger use to cargo use according to the invention involves, generally speaking, removal of seats, carpeting, and galleys. An example of a more detailed procedure, for use in a Boeing 727-100 aircraft, is as follows. The seats, carpets and seat track covers are removed from the interior of the aircraft. All windscreens and closets are removed; all affected wires are capped and stowed. The floor mount Ⓡd aisle emergency light system is removed, and all related wires are capped and stowed. The galley is removed from the interior of the aircraft. Any wires associated with the galley are capped and stowed. Galley power switches are turned off and are appropriately marked so as not to be turned on. Water supply and drain lines associated with the galley are capped. All lavatories are flushed and drained and circuit breakers affecting water heaters and flush motor operations are collared. Waste containers are emptied and paper supplies are removed. All items are removed from overhead luggage bins. The right-hand mid-cabin galley door slide pack is removed. The right-hand galley service door girt latches are removed. The bussel assembly on the aft side of the right-hand forward lavatory is removed. Head bumper material is installed over the exposed ends of the overhead baggage racks. Passenger cabin emergency equipment may be removed, if necessary; if such equipment is removed, all signs or placards referring to such equipment should be removed or covered.

Doors of the aircraft also must be slightly modified. The right-hand mid-cabin door will have the inner handle removed. The right-hand mid-cabin and both overwing doors are not available for emergency exits; accordingly, an appropriate placard or sign should be placed over exterior signs referring to such exit. Further, the PAX oxygen system should be deactivated.

After the removal process is complete, the cargo locks are attached to the existing seat tracks. The floor panels are also attached to the existing seat tracks. The containers, which have been loaded With cargo outside the aircraft, are brought into the aircraft through the passenger entryway and secured to the cabin floor by the cargo locks.

When it is desired to convert the aircraft back to passenger service, the steps are simply reversed.

It should be understood that the above detailed procedures are listed only by way of example. It will, however, be readily apparent to those of skill in the art of aircraft operation and maintenance what steps will be required in the preparation of a particular passenger aircraft for installation and removal of the system of the invention.

It Will be understood that invention is also adaptable to larger aircraft having two aisles, so that each row is divided into two side sections and a central section. The central section and each side section contain two tracks running longitudinally most of the length of the aircraft cabin. As described above, cargo locks and floor panels are attached to the tracks. The containers of the invention then are rolled along and are secured to the latches. The containers in the central portion of such an aircraft would preferably be rectangular in cross section when viewed from the front or rear.

It will be appreciated that there are considerable variations that can be accomplished on a system and method of the invention without departing from its scope. As a result, though a preferred embodiment of a system and method of the invention has been described above, it is emphasized that the invention is not limited to a preferred embodiment, and there exist alternative embodiments that are fully encompassed within the invention's scope, Which is intended only to be limited by the scope of the appended claims.

What is claimed is:

1. A system for temporarily adapting all or a selected portion of a passenger cabin of a passenger aircraft to the carriage of cargo, comprising:
    (a) a plurality of containers;
    (b) fastening means for fastening each one of said containers in place in a passenger cabin of the passenger aircraft; and
    (c) weight distributing means for distributing the weight of said containers over the floor of the passenger cabin of the passenger air craft;
    wherein said containers are (i) dimensioned to pass through a passenger door of the aircraft, fit under the overhead luggage racks, and, when one container is positioned on each side of the passenger cabin of the passenger aircraft, leaves sufficient space between them to permit an aisle of sufficient width to permit the passage of a person; and (ii) are sufficiently strong that, when loaded with cargo and fastened in place by said fastening means, will contain the cargo when subjected to accelerations of up to 9g's in the forward direction, 1.5g's in the aft direction, 3.0g's in the upward direction, 6.0g's in the downward direction, and 3.0g's in each lateral direction with an additional multiplication factor of 15 percent for safety; and
    wherein said fastening means and said containers are both sufficiently strong that, when said containers are loaded with cargo and fastened in place by said fastening means, said containers will remain in place when subjected to accelerations of up to 9g's in the forward direction, 1.5g's in the aft direction, 3.0g's in the upward direction, 6.0g's in the downward direction, and 3.0 g's in each lateral direction with an additional multiplication factor of 15 percent for safety;
    said fastening means comprising existing passenger seat tracks;
    whereby said weight spreading means assures that limits on the weight of a floor of the cabin of the passenger aircraft are not exceeded even when said containers are fully loaded; and
    whereby passenger seats may be provided and passengers may be carried in the passenger cabin of the aircraft in a portion thereof other than a selected portion temporarily adapted to the carriage of cargo wherein said system is located.

2. A system as recited in claim 1, wherein at least one of said containers has an outboard end facing an inner wall of the aircraft cabin, which outboard end is curved to follow the configuration of the inner wall.

3. A system as recited in claim 1, wherein each of said containers has an inboard end, an outboard end, two sides, and a top, each made from rotationally molded cross-linked polyethylene.

4. A system as recited in claim 3, wherein at least one of said sides is ribbed.

5. A system as recited in claim 3, wherein said top has a stiffener attached thereto.

6. A system as recited in claim 1, wherein said containers are sufficiently strong to contain cargo weighing up to 560 pounds, and said fastening means are sufficiently strong to restrain a container having cargo weighing up to 560 pounds.

7. A system as recited in claim 1, wherein said containers have rolling means attached to the bottom thereof.

8. A system as recited in claim 1, wherein said fastening means comprises (a) conventional passenger cabin seat tracks extending longitudinally the length of the passenger cabin in one or more substantially parallel pairs; and (b) cargo locks rigidly attached to said seat tracks positioned in pairs transversely to one another, so that two of said cargo locks are positioned to engage each of said containers.

9. A system as recited in claim g, wherein each of said containers comprises a horizontal flange on at least one of its sides said flange being adapted to be engaged by said cargo locks.

10. A system as recited in claim 1, wherein said weight distributing means comprises a plurality of substantially flat panels, which panels rest on the floor of the passenger cabin.

11. A system as recited in claim 10, wherein each of said panels is a composition of an inner layer of lightweight wood and two outer layers of metal.

12. A system as recited in claim 10, wherein each of said panels is rigidly attached to the floor of the aircraft cabin.

13. A system as recited in claim 8, wherein said weight distributing means comprises a plurality of substantially flat panels located on the floor of the passenger cabin arranged in two continuous rows corresponding to each pair of tracks, one of said rows being between one of said tracks and an aisle and the other of said rows being between an aisle and a sidewall of the passenger cabin, said panels being rigidly attached to said seat tracks.

14. A system as recited in claim 10 or 13, wherein each of said floor panels comprises sideways restraining means for restraining said containers against movement sideways in the aircraft cabin.

15. A system as recited in claim 14, wherein said sideways restraining means comprises upwardly extending guide rails running longitudinally along the aircraft cabin.

16. A system as recited in claim 15, wherein said containers have inboard and outboard ends and have a longitudinal flange along the bottom of each one of said ends, said longitudinal flange being adapted to engage said guide rails.

17. A method of temporarily adapting to the carriage of cargo all or a selected portion of the passenger cabin of a passenger aircraft having seats attached to one or more pairs of longitudinally extending seat tracks, galleys, and carpeting, comprising the steps of:

(a) removing, from all of the passenger cabin or the selected portion thereof, seats, gallyes, and carpeting normally used to accommodate passengers;
(b) attaching cargo locks to the seat tracks;
(c) installing weight distributing means on the floor of the passenger cabin; and
(d) installing containers so as to engage said cargo locks and rest on said eight distribution means, said containers being dimensioned to pass through a passenger door of the passenger aircraft, fit under the overhead luggage racks, and when one container is positioned on each side of the passenger cabin of the passenger aircraft, leave sufficient space between the containers to permit an aisle of sufficient width to permit the passage of a person, said containers being sufficiently strong, when loaded with cargo and engaging said cargo locks, to contain the cargo when subjected to accelerations of up to 9g's in the forward direction, 1.5g's in the aft direction, 3.0g's in the upward direction, 6.0g's in the downward direction, and 3.0g's in each lateral direction with an additional multiplication factor of 15 percent for safety; said seat tracks and said cargo locks being sufficiently strong to hold said containers in place when the containers are loaded with cargo and when the passenger aircraft is subjected to accelerations of up to 9g's in the forward direction, 1.5g'in the aft direction, 3.0g's in the upward direction, 6.0g's in the downward direction, and 3.0g's in each lateral direction with an additional multiplication factor of 15 percent for safety;
whereby said weight spreading means assures that limits on the weight of a floor of the cabin of the passenger aircraft are not exceeded even when said containers are fully loaded; and
whereby passenger seats may be provided and passengers may be carried in the passenger cabin of the aircraft in a portion thereof other than a selected portion temporarily adapted to the carriage of cargo where said steps of removing, attaching, and installing are performed.

18. A method as recited in claim 17, wherein said step of installing weight distributing means comprises the step of installing substantially flat panels on the floor of the cabin.

19. A method as recited in claim 15, wherein said step of installing substantially flat panels on the floor of the cabin comprises the step of installing substantially flat panels in parallel longitudinal rows between a seat track and an aisle of the cabin and a seat track and the sidewall of the cabin.

* * * * *